United States Patent
Lu

(10) Patent No.: US 9,363,688 B2
(45) Date of Patent: Jun. 7, 2016

(54) REPAIR METHOD AND DEVICE FOR MISSING DETECTION OF CONTROL CHANNEL

(71) Applicant: Huawei Technologies Co., Ltd., Shenzhen (CN)

(72) Inventor: Jun Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 186 days.

(21) Appl. No.: 14/201,196

(22) Filed: Mar. 7, 2014

(65) Prior Publication Data

US 2014/0185426 A1 Jul. 3, 2014

Related U.S. Application Data

(63) Continuation of application No. PCT/CN2012/083473, filed on Oct. 25, 2012.

(51) Int. Cl.
*G06F 11/00* (2006.01)
*H04W 24/02* (2009.01)
*H04W 72/04* (2009.01)
*H04L 1/00* (2006.01)
*H04L 1/20* (2006.01)
*H04L 1/18* (2006.01)

(52) U.S. Cl.
CPC ............ *H04W 24/02* (2013.01); *H04L 1/0061* (2013.01); *H04L 1/203* (2013.01); *H04W 72/042* (2013.01); *H04L 1/1812* (2013.01)

(58) Field of Classification Search
CPC .................................................. H04W 24/02
See application file for complete search history.

(56) References Cited

U.S. PATENT DOCUMENTS

| | | | |
|---|---|---|---|
| 2006/0141933 A1 | 6/2006 | Smee et al. | |
| 2009/0196204 A1 | 8/2009 | Astely et al. | |
| 2010/0265906 A1* | 10/2010 | Bucknell et al. | 370/329 |
| 2012/0026985 A1* | 2/2012 | Ren et al. | 370/336 |
| 2013/0039292 A1* | 2/2013 | Liu et al. | 370/329 |
| 2013/0176982 A1 | 7/2013 | Han et al. | |
| 2013/0201932 A1 | 8/2013 | Ko et al. | |

FOREIGN PATENT DOCUMENTS

| | | |
|---|---|---|
| CN | 101227251 A | 7/2008 |
| CN | 10254779 A | 7/2012 |
| CN | 102571309 A | 7/2012 |
| EP | 2645786 A1 | 10/2013 |
| RU | 2494551 | 2/2009 |

(Continued)

OTHER PUBLICATIONS

Chinese Office Action received in Application No. 201280002160.9 mailed Apr. 24, 2015, 7 pages.

(Continued)

*Primary Examiner* — Huy D Vu
*Assistant Examiner* — Kevin Cunningham
(74) *Attorney, Agent, or Firm* — Slater Matsil, LLP

(57) ABSTRACT

Embodiments of the present invention provide a repair method for missing detection of a control channel and relate to the field of communications. The method includes detecting whether a user equipment misses detecting a physical downlink control channel. After it is detected that the user equipment misses detecting the physical downlink control channel, a repair is performed using a repair policy.

14 Claims, 3 Drawing Sheets

(56) References Cited

FOREIGN PATENT DOCUMENTS

| RU | 20100136937 | | 2/2009 |
| WO | 2011041623 | A1 | 4/2011 |
| WO | 2011149286 | A2 | 12/2011 |
| WO | 2012050342 | A2 | 4/2012 |
| WO | 2012068934 | A1 | 5/2012 |

OTHER PUBLICATIONS

International Search Report and Written Opinion received in Application No. PCT/CN2012/083473 mailed Jul. 11, 2013, 10 pages.

* cited by examiner

REPAIR METHOD AND DEVICE FOR MISSING DETECTION OF CONTROL CHANNEL

This application is a continuation of International Application No. PCT/CN2012/083473, filed on Oct. 25, 2012, which is hereby incorporated by reference in its entirety.

TECHNICAL FIELD

The present invention relates to the field of communications, and in particular, to a repair method and device for missing detection of a control channel.

BACKGROUND

A PDCCH (physical downlink control channel) is one of control channels of an LTE (long term evolution) system. The PDCCH indicates a usage condition of an uplink transmission resource of a PUSCH (physical uplink shared channel) to a UE (user equipment), which includes a time/frequency resource used by the UE, and parameters such as modulation and code rate; and at the same time, indicates a usage condition of a downlink transmission resource of a PDSCH (physical downlink shared channel).

In an LTE system, an eNodeB (evolved NodeB or evolved base station) delivers an uplink grant (UL grant) to a UE through a PDCCH, and the UE performs corresponding uplink data transmission after receiving the uplink grant.

However, when a terminal misses detecting the uplink grant, an uplink transmission resource is wasted, and at the same time, a downlink throughput rate becomes low, thereby causing deterioration of LTE system performance.

SUMMARY OF THE INVENTION

Embodiments of the present invention provide a repair method and device for missing detection of a control channel, so that a waste of an uplink resource can be reduced and a downlink throughput rate can be increased, thereby improving LTE system performance.

According to one aspect of the present invention, a repair method for missing detection of a control channel is provided. It is detected whether a UE misses detecting a PDCCH. After it is detected that the UE misses detecting the PDCCH, a repair is performed using a repair policy.

According to another aspect of the present invention, a base station device is provided. A detecting unit is configured to detect whether a UE misses detecting a PDCCH. A repairing unit is configured to, after the detecting unit detects that the UE misses detecting the PDCCH, perform repair by using a repair policy.

After the foregoing technical solutions are adopted, with the repair method and base station device for missing detection of a control channel provided in the embodiments of the present invention, it is detected whether a UE misses detecting a PDCCH, and after it is detected that the UE misses detecting the PDCCH, corresponding repair is performed by using a repair policy. In this way, a waste of an uplink resource is reduced and a downlink throughput rate is increased, thereby improving LTE system performance.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
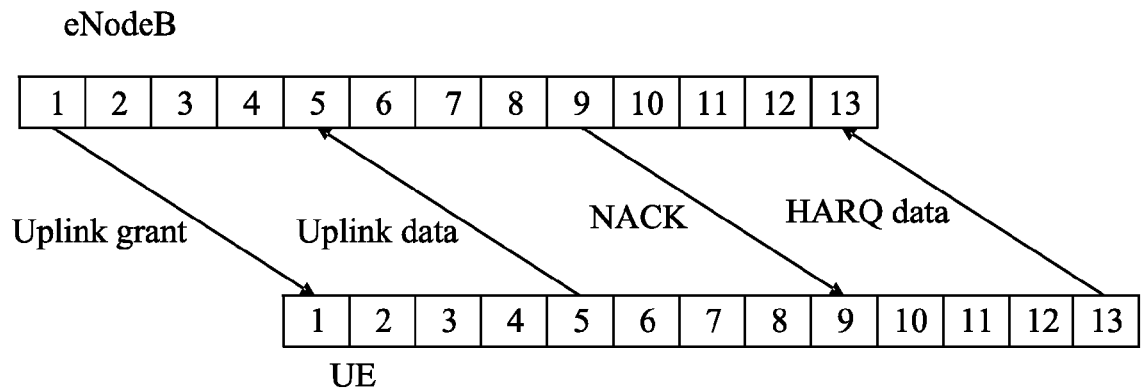
FIG. 1 is a schematic diagram of data transmission between a base station and a UE.

To better understand the embodiments of the present invention, the following first describes an application scenario of the embodiments of the present invention with reference to FIG. 1.

In FIG. 1, a block 1 to a block 12 represent TTIs (transmission time interval). As shown in FIG. 1, in a first TTI, an eNodeB delivers an uplink grant (UL Grant) through a PDCCH. The uplink grant includes a resource position where a UE transmits uplink data, a scheduling MCS (modulation and coding scheme), and information about whether a downlink CQI (channel quality indicator) is included. After receiving the uplink grant, in a fifth TTI, the UE transmits uplink data at the resource position specified in the uplink grant. At a ninth TTI after the uplink grant is delivered, the eNodeB performs CRC (cyclic redundancy check) verification on the data transmitted in the uplink by the UE; if the verification is correct, the base station feeds back an ACK (acknowledge) to the UE and ends this initial transmission; and if the verification is incorrect, the base station feeds back a NACK (not acknowledge) to the UE. When the uplink transmission adopts non-adaptive HARQ (hybrid automatic repeat request) retransmission, after the UE receives a NACK, at a thirteenth TTI, data retransmission is directly performed at the same resource position by using the same MCS rather than being performed through a PDCCH indication; when the uplink transmission adopts adaptive HARQ retransmission, a PDCCH indication is used to instruct the UE to perform data retransmission.

Figure 2:
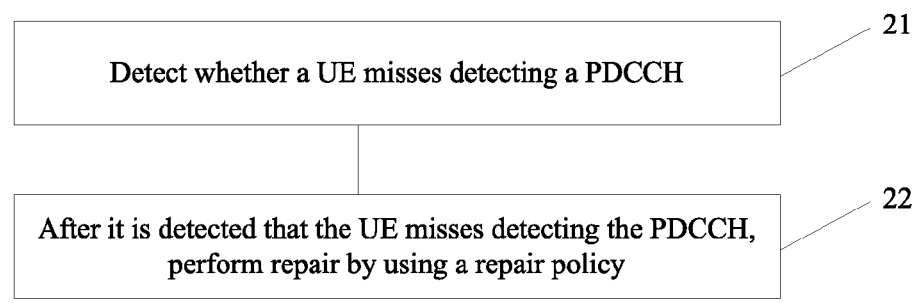
FIG. 2 is a flow chart of a repair method for missing detection of a control channel according to an embodiment of the present invention.

FIG. 2 is a flow chart of a repair method for missing detection of a control channel according to an embodiment of the present invention. As shown in FIG. 2, an embodiment of the present invention provides a repair method for missing detection of a control channel; and the method is described based on a base station, and the method includes the following steps.

21: Detect whether a UE misses detecting a PDCCH.

In the specification, that a UE misses detecting a control channel means that a base station (such as an eNodeB) delivers a control channel indication (such as an uplink grant) to a UE, but the UE does not detect the control channel indication.

In the embodiment of the present invention, various manners can be used to detect whether a UE misses detecting a PDCCH.

Optionally, in an embodiment of the present invention, the detecting whether a UE misses detecting a PDCCH may include, when CRC verification is incorrect, correlating (including self-correlating and cross-correlating) a signal at a predetermined position and a pre-stored local pilot sequence to obtain a correlation value, where the predetermined position is specified by the base station in the uplink grant. When the correlation value is smaller than a first threshold, it is determined that the UE misses detecting the PDCCH.

In the embodiment of the present invention, the pre-stored local pilot sequence is generated in advance by the base station by using a Zadoff-Chu sequence. The correlation value and the first threshold have the same value range. Specifically, the correlation value falls within [0, 1], and the first threshold $\in (0, 1)$, where the representation of 1 is related to a specific implementation manner, which is not limited in the present invention. The first threshold may be preset manually, and the setting of the first threshold is related to accuracy of detection on missing detection of a PDCCH.

Optionally, in another embodiment of the present invention, the detecting whether a UE misses detecting a PDCCH may include, when CRC verification is incorrect, comparing predetermined uplink RSRP (Reference Signal Received Power, reference signal received power) with a second threshold, and at the same time, comparing a predetermined uplink SINR (Signal to Interference plus Noise Ratio, signal to interference plus noise ratio) with a third threshold; and when the predetermined uplink RSRP is smaller than the second threshold and the predetermined uplink SINR is smaller than the third threshold, determining that the UE misses detecting the PDCCH.

In the embodiment of the present invention, a value range of the uplink RSRP is: [−200 dBm, 30 dBm]; a value range of the uplink SINR is: [−30 dB, 40 dB]; the second threshold $\in$ [−200 dBm, 30 dBm]; and the third threshold $\in$ [−30 dB, 40 dB]. The second threshold and the third threshold may be preset manually, and the set thresholds are related to accuracy of detection on missing detection of a PDCCH.

Further, in still another embodiment of the present invention, a system critical condition may be set to indicate which of the foregoing manners is used to detect whether a UE misses detecting a PDCCH. The system critical condition may be that, for example, the base station indicates that a 16QAM (Quadrature Amplitude Modulation, quadrature amplitude modulation) modulation manner is used for uplink data transmission. Therefore, optionally, before the detecting whether a UE misses detecting a PDCCH in step 21, the method may further include presetting a system critical condition for a detection manner for detecting whether the UE misses detecting the PDCCH.

When the system critical condition is not satisfied, the detecting whether a UE misses detecting a PDCCH in step 21 may include, when CRC verification is incorrect, correlating a signal at a predetermined position and a pre-stored local pilot sequence to obtain a correlation value, where the predetermined position is specified by the base station in the uplink grant; and when the correlation value is smaller than a first threshold, determining that the UE misses detecting the PDCCH.

When the system critical condition is satisfied, the detecting whether a UE misses detecting a PDCCH in step 21 may include, when CRC verification is incorrect, comparing predetermined uplink RSRP with a second threshold, and at the same time, comparing a predetermined uplink SINR with a third threshold; and when the predetermined uplink RSRP is smaller than the second threshold and the predetermined uplink SINR is smaller than the third threshold, determining that the UE misses detecting the PDCCH. Specific limits of the correlation value, the first threshold, the uplink RSRP, the uplink SINR, the second threshold, and the third threshold are the same as those described in the foregoing, and for specific content, reference may be made to the foregoing description.

22: After it is detected that the UE misses detecting the PDCCH, perform repair by using a repair policy.

The repair policy may include the following steps.

1: An uplink grant indication is re-delivered to the UE to instruct the UE to adopt an uplink adaptive HARQ (Hybrid Automatic Repeat Request, hybrid automatic repeat request) to retransmit data. When the base station adopts uplink non-adaptive HARQ retransmission, a PDCCH indication is delivered only during initial transmission, and when the UE misses detecting the control channel PDCCH, the UE cannot obtain a transmission size and a transmission position of data in the initial transmission, thereby leading to a transmission failure of uplink retransmitted data and affecting an uplink throughput rate. By adopting this repair policy, when the UE misses detecting the control channel, the base station re-delivers an uplink grant indication to the UE, so that invalid uplink retransmission can be avoided, a waste of an uplink resource can be reduced, and an uplink throughput rate can be increased.

2: A CRC verification error determined in a first TTI is not counted in NACK statistics. A service data packet error ratio caused by that the UE misses detecting the control channel PDCCH is eliminated from statistics about data packet error ratio, so that accuracy of data packet MCS selection of the base station can be improved and transmission efficiency of the base station can be improved.

3: A CQI received in a first TTI is discarded and is not used for determining downlink channel quality. When the UE misses detecting the control channel PDCCH, accuracy of the CQI transmitted in this TTI is affected; and adopting an incorrect CQI to determine the downlink channel quality is adverse to selection of a data packet MCS, and affects a downlink throughput rate.

4: A detected missing detection state of the control channel is counted in block error ratio statistics of the PDCCH. By adopting this repair policy, accuracy of estimation on transmission reliability of the control channel PDCCH can be improved.

The first TTI is a corresponding TTI when the base station determines that the UE misses detecting the PDCCH.

When the base station detects that the UE misses detecting the PDCCH, at least one of the repair policies 1-4 described in the foregoing may be used to perform corresponding repair. Preferably, the base station uses the four repair policies at the same time to perform repair.

With the repair method and base station device for missing detection of a control channel provided in the embodiment of the present invention, it is detected whether a UE misses detecting a PDCCH, and after it is determined that the UE misses detecting the PDCCH, corresponding repair is performed by using a repair policy. In this way, a waste of an uplink resource can be reduced and a downlink throughput rate can be improved, thereby improving LTE system performance.

To better understand the present invention, some specific embodiments in the following are taken as an example to further describe the present invention. It should also be noted that, the embodiments listed in the following are merely a part of the embodiments of the present invention, and according to content of the present invention, a person skilled in the art can easily figure out other embodiments, which all fall within the scope of the present invention.

Figure 3:
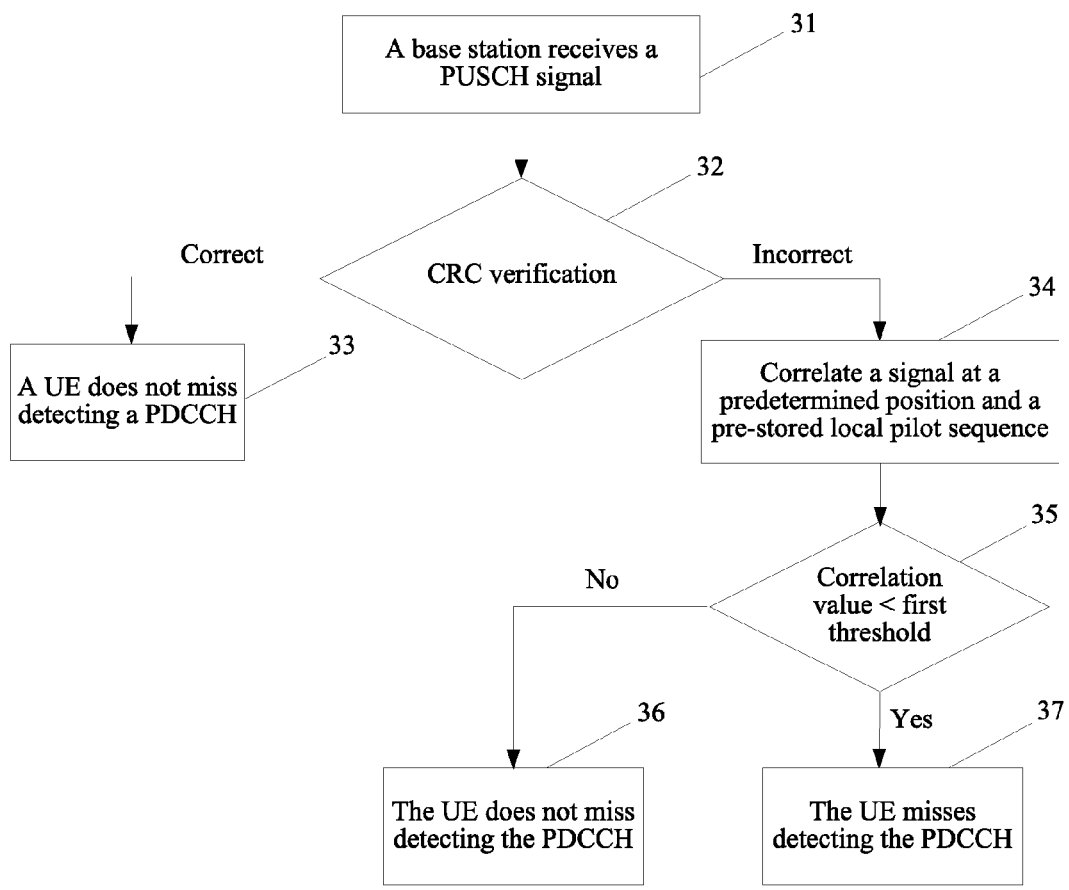
FIG. 3 is a flow chart of a method for determining that a UE misses detecting a PDCCH according to an embodiment of the present invention.

FIG. 3 is a flow chart of a method for determining that a UE misses detecting a PDCCH according to an embodiment of the present invention. Referring to FIG. 3, the method for determining that a UE misses detecting a PDCCH according to the embodiment of the present invention may include:

31: A base station receives a PUSCH signal (namely, uplink data) sent by a UE.

Before step 31, the base station sends PDCCH information to the UE to indicate usage conditions of uplink and downlink transmission resources.

32: The base station performs CRC verification on the PUSCH signal.

33: When the CRC verification is correct, the base station determines that the UE does not miss detecting the PDCCH, and further feeds back an ACK to the UE and ends this initial transmission.

34: When the CRC verification is incorrect, the base station correlates a signal at a predetermined position and a pre-stored local pilot sequence to obtain a correlation value, where the predetermined position is specified by the base station in an uplink grant.

In the embodiment of the present invention, the pre-stored local pilot sequence is generated in advance by the base station by using a Zadoff-Chu sequence.

The correlating a signal at a predetermined position and a pre-stored local pilot sequence may include: self-correlating and cross-correlating the signal at the predetermined position and the pre-stored local pilot sequence.

35: The base station determines whether the correlation value is smaller than a first threshold.

The correlation value and the first threshold have the same value range. Specifically, the correlation value falls within [0, 1], and the first threshold $\in (0, 1)$, where the representation of 1 is related to a specific implementation manner, which is not limited in the present invention. The first threshold may be preset manually, and the setting of the first threshold is related to accuracy of detection on missing detection of a PDCCH.

36: When the correlation value is not smaller than the first threshold, the base station determines that the UE does not miss detecting the PDCCH; and in this case, the base station feeds back an ACK to the UE and ends this initial transmission.

37: When the correlation value is smaller than the first threshold, the base station determines that the UE misses detecting the PDCCH.

After the base station determines that the UE misses detecting the PDCCH, at least one of the following repair policies may be used to perform corresponding repair:

the base station re-delivers an uplink grant indication to the UE to instruct the UE to adopt an uplink adaptive HARQ to retransmit data;

the base station does not count a CRC verification error determined in a first TTI in NACK statistics;

the base station discards a CQI received in a first TTI, and does not use the CQI to determine downlink channel quality; and the base station counts a detected missing detection state of the control channel in block error ratio statistics of the PDCCH;

where the first TTI is a corresponding TTI when the base station determines that the UE misses detecting the PDCCH.

After the foregoing repair policy is adopted, the base station can be prevented from spreading an error of the control channel to uplink and downlink data channels; and an effect of the control channel on the data channels is reduced, uplink and downlink throughput rates are increased, and at the same time, a closed loop is used for error handling of the control channel.

Figure 4:
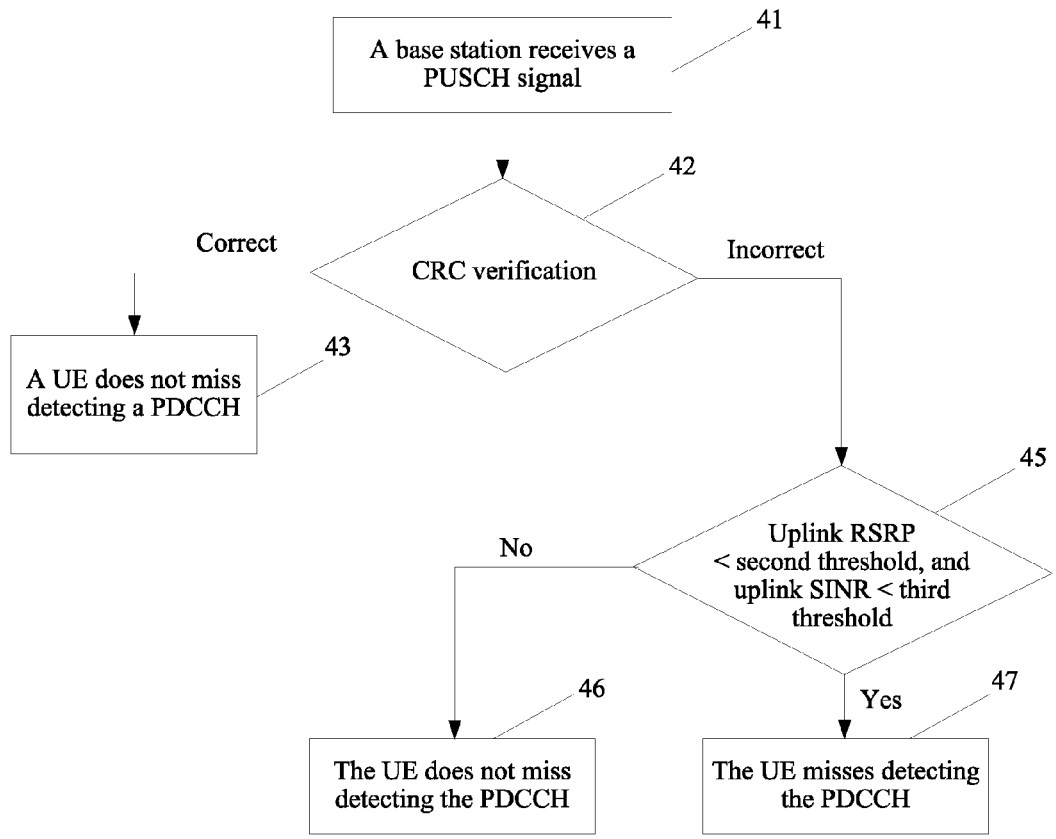
FIG. 4 is a flow chart of another method for determining that a UE misses detecting a PDCCH according to an embodiment of the present invention.
Figure 5:
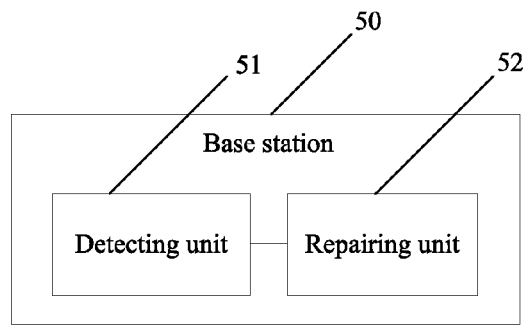
FIG. 5 is a structural block diagram of a base station device according to an embodiment of the present invention.

FIG. 4 is a flow chart of another method for determining that a UE misses detecting a PDCCH according to an embodiment of the present invention. Referring to FIG. 4, the method for determining that a UE misses detecting a PDCCH according to the embodiment of the present invention may include:

41: A base station receives, at a position where a UE is instructed to transmit an uplink resource, a PUSCH signal (namely, uplink data) sent by the UE.

Before step 41, the base station sends PDCCH information to the UE to indicate usage conditions of uplink and downlink transmission resources.

42: The base station performs CRC verification on the PUSCH signal.

43: When the CRC verification is correct, the base station determines that the UE does not miss detecting the PDCCH, and feeds back an ACK to the UE and ends this initial transmission.

44: When the CRC verification is incorrect, the base station compares predetermined uplink RSRP with a second threshold, and at the same time, compares a predetermined uplink SINR with a third threshold.

The predetermined uplink RSRP and the predetermined uplink SINR may be determined by the base station based on a pilot signal.

In the embodiment of the present invention, a value range of the uplink RSRP is: [−200 dBm, 30 dBm]; a value range of the uplink SINR is: [−30 dB, 40 dB]; the second threshold $\in$ [−200 dBm, 30 dBm]; and the third threshold $\in$ [−30 dB, 40 dB]. The second threshold and the third threshold may be preset manually, and the set thresholds are related to accuracy of detection on missing detection of a PDCCH.

45: When the predetermined uplink RSRP is not smaller than the second threshold, or the predetermined uplink SINR is not smaller than the third threshold, the base station determines that the UE does not miss detecting the PDCCH; and otherwise, perform step 46.

46: When the predetermined uplink RSRP is smaller than the second threshold and the predetermined uplink SINR is smaller than the third threshold, the base station determines that the UE misses detecting the PDCCH.

After the base station determines that the UE misses detecting the PDCCH, at least one of the following repair policies may be used to perform corresponding repair:

the base station re-delivers an uplink grant indication to the UE to instruct the UE to adopt an uplink adaptive HARQ to retransmit data;

the base station does not count a CRC verification error determined in a first TTI in NACK statistics;

the base station discards a CQI received in a first TTI, and does not use the CQI to determine downlink channel quality; and the base station counts a detected missing detection state of the control channel in block error ratio statistic of the PDCCH;

where the first TTI is a corresponding TTI when the base station determines that the UE misses detecting the PDCCH.

After the foregoing repair policy is adopted, the base station can be prevented from spreading an error of the control channel to uplink and downlink data channels; and an effect of the control channel on the data channels is reduced, uplink and downlink throughput rates are increased, and at the same time, a closed loop is used for error handling of the control channel.

It should be pointed out that the methods for determining that a UE misses detecting a PDCCH shown in FIG. 3 and FIG. 4 may be used separately, and definitely may be used in combination. For example, in another embodiment of the present invention, the detecting whether a UE misses detecting a PDCCH may further include, when cyclic redundancy check verification is incorrect, correlating a signal at a predetermined position and a pre-stored local pilot sequence to obtain a correlation value, where the predetermined position is specified by the base station in an uplink grant, when the cyclic redundancy check verification is incorrect, comparing predetermined uplink RSRP with a second threshold, and at the same time, comparing a predetermined uplink SINR with a third threshold; and when the correlation value is smaller than a first threshold, the predetermined uplink RSRP is smaller than the second threshold, and the predetermined uplink SINR is smaller than the third threshold, determining that the UE misses detecting the PDCCH.

It should also be pointed out that a system critical condition may also be set to indicate which method is used. For example, in another embodiment of the present invention, a critical condition may be set; and when the system critical condition is not satisfied, the method for determining missing detection of a PDDCH shown in FIG. 3 is used, and when the system critical condition is satisfied, the method for determining missing detection of a PDDCH shown in FIG. 4 is used, where the system critical condition may be that, for example, the base station indicates that a 16QAM (Quadrature Amplitude Modulation, quadrature amplitude modulation) modulation manner is used for uplink data transmission.

With the repair method for missing detection of a control channel provided in the embodiment of the present invention, by identifying an abnormal state of a control channel and repairing the abnormal state of the control channel, a risk that an error of the control channel is spread to a data channel is lowered, a waste of an uplink resource is reduced, and at the same time, uplink and downlink throughput rates of an LTE system are increased, thereby improving LTE system performance.

Corresponding to the repair method for missing detection of a control channel provided in the foregoing embodiment of the present invention, an embodiment of the present invention further provides a base station device 50, where the device 50 includes a detecting unit 51 and a repairing unit 52.

The detecting unit 51 is configured to detect whether a UE misses detecting a PDCCH.

The repairing unit 52 is configured to, after the detecting unit detects that the UE misses detecting the PDCCH, perform repair by using a repair policy.

The repair policy includes at least one of the following:
re-delivering an uplink grant indication to the UE to instruct the UE to adopt an uplink adaptive HARQ to retransmit data;
not counting a CRC verification error determined in a first TTI in NACK statistics;
discarding a CQI received in a first TTI and not using the CQI to determine downlink channel quality; and
counting a detected missing detection state of the control channel in block error ratio statistic of the PDCCH;
where the first TTI is a corresponding TTI when a base station determines that the UE misses detecting the PDCCH.

With the repair method and base station device for missing detection of a control channel provided in the embodiment of the present invention, it is detected whether a UE misses detecting a PDCCH, and after it is determined that the UE misses detecting the PDCCH, corresponding repair is performed by using a repair policy. In this way, a waste of an uplink resource can be reduced and a downlink throughput rate can be improved, thereby improving LTE system performance.

In the embodiment of the present invention, the detecting unit 51 may determine, in various different manners, that the UE misses detecting the PDCCH, which are described in the following separately.

Optionally, in an embodiment of the present invention, the detecting unit 51 may be configured to, when CRC verification is incorrect, correlate a signal at a predetermined position and a pre-stored local pilot sequence to obtain a correlation value, where the predetermined position is specified by the base station in an uplink grant; and when the correlation value is smaller than a first threshold, determine that the UE misses detecting the PDCCH.

Optionally, in another embodiment of the present invention, the detecting unit 51 may be configured to, when CRC verification is incorrect, compare predetermined uplink RSRP with a second threshold, and at the same time, compare a predetermined uplink SINR with a third threshold; and when the predetermined uplink RSRP is smaller than the second threshold and the predetermined uplink SINR is smaller than the third threshold, determine that the UE misses detecting the PDCCH.

Optionally, in still another embodiment of the present invention, the detecting unit 51 is configured to: before detecting whether the UE misses detecting the PDCCH, preset a system critical condition for a detection manner for detecting whether the UE misses detecting the PDCCH.

When the critical condition is not satisfied, the detecting unit 51 is further configured to, when CRC verification is incorrect, correlate a signal at a predetermined position and a pre-stored local pilot sequence to obtain a correlation value, where the predetermined position is specified by the base station in an uplink grant; and when the correlation value is smaller than a first threshold, determine that the UE misses detecting the PDCCH.

When the system critical condition is satisfied, the detecting unit 51 is further configured to, when the CRC verification is incorrect, compare predetermined uplink RSRP with a second threshold, and at the same time, compare a predetermined uplink SINR with a third threshold and when the predetermined uplink RSRP is smaller than the second threshold and the predetermined uplink SINR is smaller than the third threshold, determine that the UE misses detecting the PDCCH. Where specific limits of the correlation value, the first threshold, the uplink RSRP, the uplink SINR, the second threshold, and the third threshold are the same as those described in the foregoing method embodiment, and for specific content, reference may be made to the description in the foregoing method embodiment.

Optionally, in still another embodiment of the present invention, the detecting unit 51 is configured to, when cyclic redundancy check verification is incorrect, correlate a signal at a predetermined position and a pre-stored local pilot sequence to obtain a correlation value, where the predetermined position is specified by the base station in an uplink grant, when the cyclic redundancy check verification is incorrect, compare predetermined uplink RSRP with a second threshold, and at the same time, compare a predetermined uplink SINR with a third threshold; and when the correlation value is smaller than a first threshold, the predetermined uplink RSRP is smaller than the second threshold, and the predetermined uplink SINR is smaller than the third threshold, determine that the UE misses detecting the PDCCH.

With the base station device provided in the embodiment of the present invention, by identifying an abnormal state of a control channel and repairing the abnormal state of the control channel, a risk that an error of the control channel is spread to a data channel is lowered, a waste of an uplink resource is reduced, and at the same time, uplink and downlink throughput rates of an LTE system are increased, thereby improving LTE system performance.

It should be pointed out that the base station device provided in the embodiment of the present invention is corresponding to the repair method for missing detection of a control channel provided in the foregoing embodiment of the present invention; and the repair method for missing detection of a control channel has been described in detail in the foregoing description, and therefore, for corresponding content, reference may be made to the foregoing description, and which is not described herein again.

It should be noted that division of the units included in the foregoing base station embodiment is merely based on function logic, but the division is not limited to the foregoing manner as long as corresponding functions can be implemented; and in addition, specific names of the functional units are merely used for being distinguished from each other, but are not intended to limit the protection scope of the present invention.

A person of ordinary skill in the art may understand that all or a part of the steps of the methods in the foregoing embodiments may be implemented by a program instructing relevant hardware. The program may be stored in a computer readable storage medium, and the storage medium may be a read-only memory, a magnetic disk, an optical disc, or the like.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the claims.

What is claimed is:

1. A repair method for missing detection of a control channel, comprising:
sending, by a base station, a physical downlink control channel (PDCCH) signal to a user equipment (UE) to indicate usage conditions of uplink and downlink transmission resources;
receiving, by the base station, a physical uplink shared channel (PUSCH) signal sent by the UE;
determining, by the base station, whether the UE missed detecting the PDCCH signal; and
performing, by the base station, repair using a repair policy after detecting that the UE missed detecting the PDCCH signal,
wherein determining whether the UE missed detecting the PDCCH signal comprises:
performing, by the base station, cyclic redundancy check (CRC) verification on the PUSCH signal;
correlating, by the base station, a signal at a predetermined position and a pre-stored local pilot sequence to obtain a correlation value when the CRC verification is incorrect, wherein the predetermined position is specified by a base station in an uplink grant, wherein the base station delivers the uplink grant to the UE through the PDCCH signal, and wherein the pre-stored local pilot sequence is generated in advance by the base station using a Zadoff-Chu sequence; and
determining, by the base station, that the UE missed detecting the PDCCH signal, when the correlation value is smaller than a first threshold.

2. The method according to claim 1, wherein performing the repair using the repair policy comprises re-delivering an uplink grant indication to the UE to instruct the UE to adopt an uplink adaptive hybrid automatic repeat request (HARQ) to retransmit data.

3. The method according to claim 1, wherein performing the repair using the repair policy comprises discounting cyclic redundancy check (CRC) verification error determined in a first transmission time interval (TTI) in negative acknowledgement (NACK) statistics, wherein the first TTI is a corresponding transmission time interval when it is determined that the UE missed detecting the PDCCH signal.

4. The method according to claim 1, wherein performing the repair using the repair policy comprises discarding a channel quality indicator (CQI) received in a first transmission time interval (TTI) and not using the CQI to determine downlink channel quality, wherein the first TTI is a corresponding transmission time interval when it is determined that the UE missed detecting the PDCCH signal.

5. The method according to claim 1, wherein performing the repair using the repair policy comprises counting a detected missing detection state of the PDCCH signal in block error ratio statistic of the PDCCH signal.

6. The method according to claim 1, wherein before determining, by the base station, whether the UE missed detecting the PDCCH signal, the method further comprising:
determining, by the base station, a modulation manner indicated to the UE using for uplink data transmission is less than 16 quadrature amplitude modulation (QAM).

7. The method according to claim 6, wherein if the modulation manner indicated to the UE using for uplink data transmission is not less than 16 QAM, then the method further comprises:
performing, by the base station, CRC verification on the PUSCH signal;
comparing, by the base station, predetermined uplink reference signal received power (RSRP) with a second threshold, and comparing a predetermined uplink signal to interference plus noise ratio (SINK) with a third threshold, when the CRC verification is incorrect;
determining, by the base station, that the UE misses detecting the PDCCH signal, when the predetermined uplink RSRP is smaller than the second threshold and the predetermined uplink SINR is smaller than the third threshold; and
performing, by the base station, the repair by using the repair policy after determining that the UE missed detecting the PDCCH signal.

8. A base station device, comprising:
a sending unit, configured to send a physical downlink control channel (PDCCH) signal to a user equipment (UE) to indicate usage conditions of uplink and downlink transmission resources;
a receiving unit, configured to receive a physical uplink shared channel (PUSCH) signal sent by the UE;
a detecting unit, configured to determine whether the UE missed detecting the PDCCH signal by performing cyclic redundancy check (CRC) verification on the PUSCH signal, correlating a signal at a predetermined position and a pre-stored local pilot sequence to obtain a correlation value when the CRC verification is incorrect, and determining that the UE missed detecting the PDCCH signal when the correlation value is smaller than a first threshold, wherein the predetermined position is specified by a base station in an uplink grant, wherein the base station delivers the uplink grant to the UE through the PDCCH signal, and wherein the pre-stored local pilot sequence is generated in advance by the base station using a Zadoff-Chu sequence; and a repairing unit, configured to, after the detecting unit detects that the UE missed detecting the PDCCH signal, perform repair by using a repair policy.

9. The base station device according to claim 8, wherein the repairing unit is configured to perform repair by re-delivering an uplink grant indication to the UE to instruct the UE to adopt an uplink adaptive hybrid automatic repeat request (HARQ) to retransmit data.

10. The base station device according to claim 8, wherein the repairing unit is configured to perform the repair using the repair policy by discounting cyclic redundancy check (CRC) verification error determined in a first transmission time interval (TTI) in negative acknowledgement (NACK) statistics, wherein the first TTI is a corresponding transmission time interval when it is determined that the UE missed detecting the PDCCH signal.

11. The base station device according to claim 8, wherein the repairing unit is configured to perform the repair using the repair policy by discarding a channel quality indicator (CQI) received in a first transmission time interval (TTI) and not using the CQI to determine downlink channel quality, wherein the first TTI is a corresponding transmission time interval when it is determined that the UE missed detecting the PDCCH signal.

12. The base station device according to claim 8, wherein the repairing unit is configured to perform the repair using the repair policy by counting a detected missing detection state of the PDCCH signal in block error ratio statistic of the PDCCH signal.

13. The base station device according to claim 8, wherein before determining, by the base station, whether the UE missed detecting the PDCCH signal, the detecting unit is further configured to:

determine a modulation manner indicated to the UE using for uplink data transmission is less than 16 quadrature amplitude modulation (QAM).

14. The base station device according to claim 13, wherein if the modulation manner indicated to the UE using for uplink data transmission is not less than 16 QAM, then the detecting unit is further configured to:

perform CRC verification on the PUSCH signal;

compare predetermined uplink reference signal received power (RSRP) with a second threshold, and comparing a predetermined uplink signal to interference plus noise ratio (SINR) with a third threshold, when the CRC verification is incorrect;

determine that the UE misses detecting the PDCCH signal, when the predetermined uplink RSRP is smaller than the second threshold and the predetermined uplink SINR is smaller than the third threshold; and perform the repair by using the repair policy after determining that the UE missed detecting the PDCCH signal.

* * * * *